(12) United States Patent
Mantin et al.

(10) Patent No.: US 8,494,161 B2
(45) Date of Patent: Jul. 23, 2013

(54) CONTENT PROTECTION MESSAGE EXTRACTION

(75) Inventors: Itsik Mantin, Shoham (IL); Aviad Kipnis, Efrat (IL)

(73) Assignee: Cisco Technology Inc., San Jose, CA (US)

( * ) Notice: Subject to any disclaimer, the term of this patent is extended or adjusted under 35 U.S.C. 154(b) by 13 days.

(21) Appl. No.: 13/259,349

(22) PCT Filed: Jun. 29, 2009

(86) PCT No.: PCT/IB2009/052784
§ 371 (c)(1),
(2), (4) Date: Dec. 1, 2011

(87) PCT Pub. No.: WO2011/001204
PCT Pub. Date: Jan. 6, 2011

(65) Prior Publication Data
US 2012/0087497 A1    Apr. 12, 2012

(51) Int. Cl.
*H04K 1/00*    (2006.01)
*H04N 7/167*   (2011.01)

(52) U.S. Cl.
USPC .............................. 380/210; 380/28; 380/212

(58) Field of Classification Search
None
See application file for complete search history.

(56) References Cited

U.S. PATENT DOCUMENTS

| | | | |
|---|---|---|---|
| 6,131,161 A | 10/2000 | Linnartz | |
| 7,549,058 B1 * | 6/2009 | Wang et al. | 713/189 |
| 7,856,591 B2 * | 12/2010 | Shi et al. | 714/795 |
| 7,974,714 B2 * | 7/2011 | Hoffberg | 700/94 |
| 2004/0037422 A1 | 2/2004 | Bodo et al. | |
| 2005/0207449 A1 | 9/2005 | Zhang et al. | |
| 2006/0050880 A1 | 3/2006 | Taylor et al. | |
| 2006/0140270 A1 | 6/2006 | Li et al. | |

FOREIGN PATENT DOCUMENTS

| | | |
|---|---|---|
| EP | 1 575 299 A1 | 9/2005 |
| GB | 2 310 101 A | 8/1997 |

OTHER PUBLICATIONS

Bhattacharya, et al., "A Survey on Different Video Watermarking Techniques and Comparative Analysis with Reference to H.264/AVC", Consumer Electronics, 2006, ISCE '06; 2006 IEEE Tenth International Symposium, on St. Petersburg, Russia, pp. 1-6, (2006).

International Search Report and the Written Opinion of the International Searching Authority in International Application No. PCT/IB2009/052784 mailed Sep. 14, 2009.

European Examination Report issued in European Application No. 09786463.1, mailed Jun. 18, 2012 (4 pages).

* cited by examiner

*Primary Examiner* — David Y Jung
(74) *Attorney, Agent, or Firm* — Husch Blackwell LLP

(57) ABSTRACT

A system for extracting a video-watermark embedded in a video sequence, comprising a decryption and decoding engine to receive the video sequence in a video-codec-encoded format and encrypted, then decrypt the video sequence yielding a decrypted video sequence, then decode the decrypted video sequence yielding a decrypted decoded video sequence, and then output the decrypted decoded video sequence to a display device for rendering thereon, a measurement module to measure memory usage utilized by the engine decoding at least part of the video sequence yielding measurements of memory usage, a memory usage analyzer to analyze the measurements to determine an arrangement of video frames of at least one frame type in the video sequence, and an encoding feature analyzer to analyze the arrangement of the video frames to extract the video-watermark from the video sequence. Related apparatus and methods are also described.

12 Claims, 4 Drawing Sheets

CONTENT PROTECTION MESSAGE EXTRACTION

CROSS REFERENCE TO RELATED APPLICATIONS

The present application is a 35 USC §371 application of PCT/IB2009/052784, filed on Jun. 29, 2009 and entitled "Content Protection Message Extraction", which was published on Jan. 6, 2011 in the English language with International Publication Number WO 2011/001204 the content of which is incorporated herein by reference.

FIELD OF THE INVENTION

The present invention relates to content protection message embedding and extraction.

BACKGROUND OF THE INVENTION

The following references are believed to represent the state of the art:

U.S. Pat. No. 6,131,161 to Linnartz; and
US Published Patent Application 2006/0050880 of Taylor, et al.

SUMMARY OF THE INVENTION

The present invention, in certain embodiments thereof, seeks to provide an improved system and method of embedding and extracting a content protection message from a video sequence.

There is thus provided in accordance with an embodiment of the present invention, a system for extracting a video-watermark embedded in a video sequence, the system including a plurality of operatively connected modules including a decryption and decoding engine, the decryption and decoding engine being operative to receive the video sequence in a video-codec-encoded format and cryptographically-encrypted, then decrypt the encrypted video sequence yielding a decrypted video sequence having the video-codec encoded format, then decode the decrypted video-codec-encoded video sequence yielding a decrypted decoded video sequence, and then output the decrypted decoded video sequence to a display device for rendering on the display device, a decoder buffer to store data used by the decryption and decoding engine during decoding, a measurement module to measure memory usage of the decoder buffer utilized by the decryption and decoding engine decoding at least part of the video sequence yielding a plurality of measurements of memory usage utilized by the decryption and decoding engine decoding the at least part of the video sequence, a memory usage analyzer to receive the measurements of memory usage from the measurement module, and analyze the measurements of memory usage in order to determine an arrangement of a plurality of video frames of at least one frame type in the video sequence, and an encoding feature analyzer to receive the arrangement of the video frames from the memory usage analyzer, and analyze the arrangement of the video frames of the at least one frame type in the video sequence in order to extract the video-watermark from the video sequence.

There is also provided in accordance with still another embodiment of the present invention, a system for extracting a content-protection message embedded in a video sequence, the system including a plurality of operatively connected modules including a measurement module to measure memory usage utilized by a decoder decoding at least part of the video sequence yielding a plurality of measurements of memory usage utilized by the decoder decoding the at least part of the video sequence, and a content-protection message extractor to receive the measurements of memory usage from the measurement module, and analyze the measurements of memory usage in order to extract the content-protection message from the video sequence.

Further in accordance with an embodiment of the present invention the content-protection message extractor includes a memory usage analyzer to receive the measurements of memory usage from the measurement module, and analyze the measurements of memory usage in order to determine at least one encoding feature of the video sequence, and an encoding feature analyzer to receive the at least one encoding feature from the memory usage analyzer, and analyze the at least one encoding feature of the video sequence in order to extract the content-protection message from the video sequence.

Still further in accordance with an embodiment of the present invention the modules further include a decryption and decoding engine including the decoder, the decryption and decoding engine being operative to receive the video sequence in a video-codec-encoded format and cryptographically-encrypted, then decrypt the encrypted video sequence yielding a decrypted video sequence having the video-codec encoded format, then decode the decrypted video-codec-encoded video sequence yielding a decrypted decoded video sequence, and then output the decrypted decoded video sequence to a display device for rendering on the display device.

Additionally in accordance with an embodiment of the present invention the at least one encoding features includes an arrangement of a plurality of video frames of at least one frame type in the video sequence.

Moreover in accordance with an embodiment of the present invention the arrangement of the video frames includes a plurality of positions of the video frames in the video sequence.

Further in accordance with an embodiment of the present invention the arrangement of the video frames includes a quantity of the video frames in different parts of the video sequence.

Still further in accordance with an embodiment of the present invention the encoding feature analyzer is operative to analyze the arrangement of the video frames of the video sequence in order to extract the content-protection message from the video sequence.

Additionally in accordance with an embodiment of the present invention the content-protection message includes a video watermark.

Moreover in accordance with an embodiment of the present invention the watermark includes a copyright flag.

Further in accordance with an embodiment of the present invention the watermark includes an identification of a content item included in the video sequence.

There is also provided in accordance with still another embodiment of the present invention, a method for extracting a content-protection message embedded in a video sequence, the method including measuring memory usage utilized by a decoder decoding at least part of the video sequence yielding a plurality of measurements of memory usage utilized by the decoder decoding at least part of the video sequence, and analyzing the measurements of memory usage in order to extract the content-protection message from the video sequence.

BRIEF DESCRIPTION OF THE DRAWINGS

The present invention will be understood and appreciated more fully from the following detailed description, taken in conjunction with the drawings in which.

DETAILED DESCRIPTION OF AN EMBODIMENT

Figure 1:
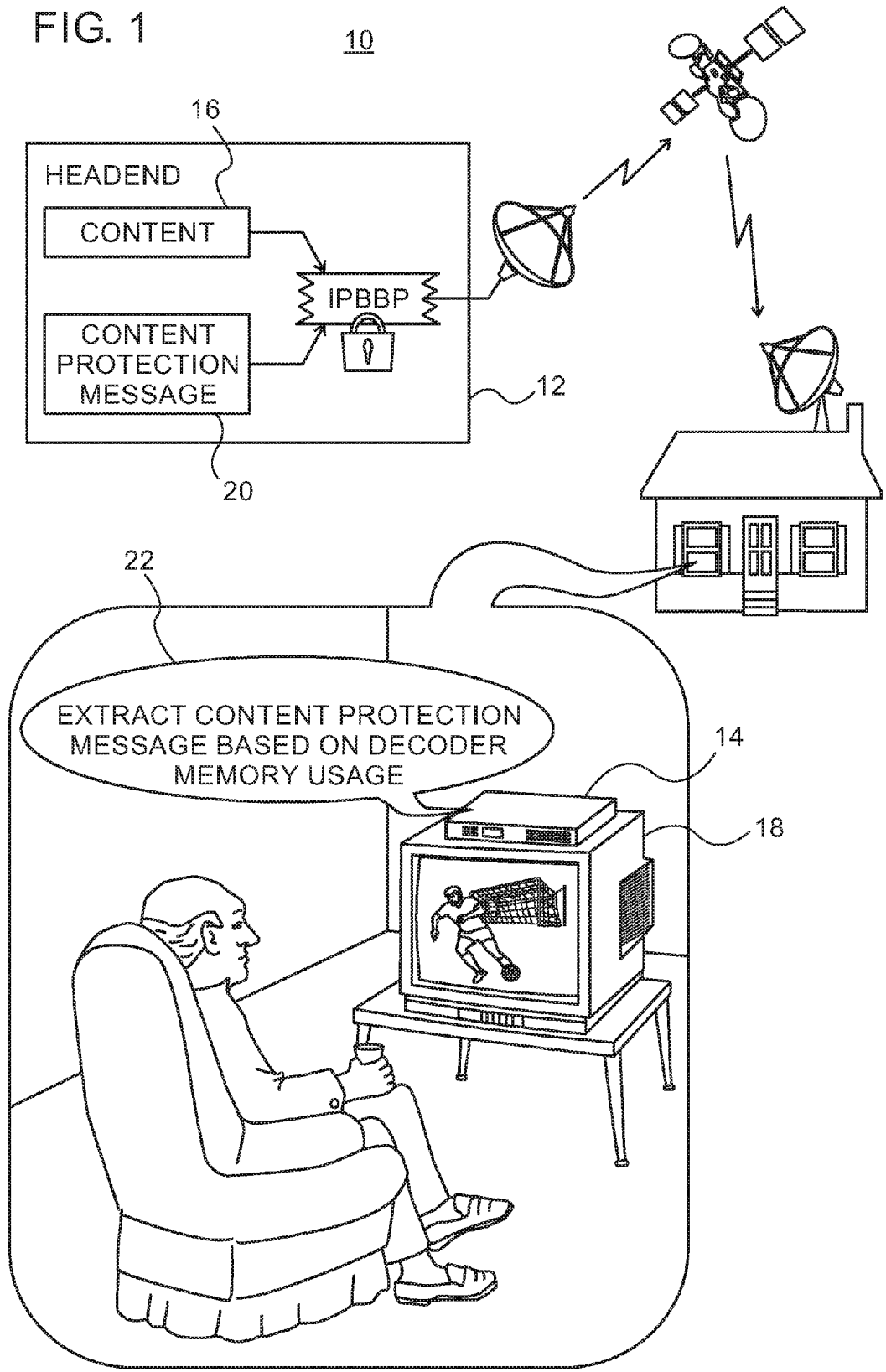
FIG. 1 is a partly pictorial, partly block diagram view of a content protection message embedding and extraction system constructed and operative in accordance with an embodiment of the present invention.

Persons skilled in the art will appreciate that, throughout the present application, a set-top box is used by way of example only, and that the present invention is not limited to a particular type of video rendering device, but rather includes any suitable device for example, a suitably configured computer system, television system, mobile device such as a mobile telephone or mobile television.

Persons skilled in the art will appreciate that, throughout the present application, a Headend is used by way of example only, and that the present invention is not limited to a particular type of content encoding device, but rather includes any suitable device.

The term "encoded" is used throughout the present specification and claims, in all of its grammatical forms, to refer to any type of data stream encoding including, for example and without limiting the scope of the definition, well known types of encoding such as, but not limited to, MPEG-2 encoding, H.264 encoding, VC-1 encoding, and synthetic encodings such as Scalable Vector Graphics (SVG) and LASER (ISO/IEC 14496-20), and so forth. It is appreciated that an encoded data stream generally requires more processing and typically more time to read than a data stream which is not encoded. Any recipient of encoded data, whether or not the recipient of the encoded data is the intended recipient, is, at least in potential, able to read encoded data without requiring cryptanalysis. It is appreciated that encoding may be performed in several stages and may include a number of different processes, including, but not necessarily limited to: compressing the data; transforming the data into other forms; and making the data more robust (for instance replicating the data or using error correction mechanisms).

The term "compressed" is used throughout the present specification and claims, in all of its grammatical forms, to refer to any type of data stream compression. Compression is typically a part of encoding and may include image compression and motion compensation. Typically, compression of data reduces the number of bits comprising the data. In that compression is a subset of encoding, the terms "encoded" and "compressed", in all of their grammatical forms, are often used interchangeably throughout the present specification and claims when referring to encoding video data.

Similarly, the terms "decoded" and "decompressed" are used throughout the present specification and claims, in all their grammatical forms, to refer to the reverse of "encoded" and "compressed" in all their grammatical forms.

The terms "scrambled" and "encrypted", in all of their grammatical forms, are used interchangeably throughout the present specification and claims to refer to any appropriate scrambling and/or encryption methods for scrambling and/or encrypting a data stream, and/or any other appropriate method for intending to make a data stream unintelligible except to an intended recipient(s) thereof. Well known types of scrambling or encrypting include, but are not limited to DES, 3DES, and AES. Similarly, the terms "descrambled" and "decrypted" are used throughout the present specification and claims, in all their grammatical forms, to refer to the reverse of "scrambled" and "encrypted" in all their grammatical forms.

Pursuant to the above definitions, the terms "encoded"; "compressed"; and the terms "scrambled" and "encrypted" are used to refer to different and exclusive types of processing. Thus, a particular data stream may be, for example:

encoded, but neither scrambled nor encrypted;
compressed, but neither scrambled nor encrypted;
scrambled or encrypted, but not encoded;
scrambled or encrypted, but not compressed;
encoded, and scrambled or encrypted; or
compressed, and scrambled or encrypted.

Likewise, the terms "decoded" and "decompressed" on the one hand, and the terms "descrambled" and "decrypted" on the other hand, are used to refer to different and exclusive types of processing.

Reference is now made to FIG. 1, which is a partly pictorial, partly block diagram view of a content protection message embedding and extraction system 10 constructed and operative in accordance with an embodiment of the present invention.

The system 10 typically includes a Headend 12 and a plurality of set-top boxes 14 (only one set-top box 14 shown for the sake of clarity).

The Headend 12 typically prepares content, typically in the form of a video sequence 16, for transmission to the set-top boxes 14. The Headend 12 is described in more detail with reference to FIG. 2. The content may be transmitted to the set-top boxes 14 by any suitable method for example, but not limited to, broadcast/multicast/unicast via satellite, cable, terrestrial, Internet Protocol or any other suitable combination thereof.

The set-top boxes 14 typically receive the video sequence 16 and prepare the video sequence 16 for rendering on a display device 18, for example, but not limited to, a television, a suitably configured computer system, a projector and screen arrangement, a mobile device such as a mobile telephone, TV or computer. The display device 18 may be a separate device from the set-top box 14 or the display device 18 may be included in an integrated device which includes the set-top box 14. The set-top boxes 14 are described in more detail with reference to FIG. 3.

There are many instances when it is desirable to embed a content protection message 20, such as a video watermark, into the video sequence 16. A video watermark may include: a copyright flag indicating that content is copyrighted; and/or an identification of a content item included in the video sequence 16.

The Headend 12 is operative to embed the content protection message 20 in the video sequence 16 during encoding of the video sequence 16. Additionally, the Headend 12 typically protects the video sequence 16 by encryption prior to transmission to the set-top boxes 14. In accordance with an alternative embodiment of the present invention encryption of the video sequence 16 is not performed.

The content protection message 20 may then be extracted by each set-top box 14 as necessary.

The embedding and extraction process is now described briefly below.

By way of introduction, the behavior of the decoding function of each set-top box 14, and in particular the amount of memory utilized during decoding, may provide an indication as to how the video sequence 16 was encoded and sometimes provide an indication of the video content itself.

The amount of memory that is utilized during decoding is significantly affected, inter alia, by the type of frame being decoded and/or the dependencies between the encoding of the different frames. By way of example only, the memory used while decoding I-frames is significantly higher compared to decoding other frame types. By way of an additional example, the usage of interlace video compression, where the presentation order of frames differ from the decoding order of the frames affects the decoding memory usage as will now be described below.

Consider for example an MPEG-2 video compression, where the frames are I1, B2, B3, P4, B5, B6, P7, . . . ; that is an I-frame I1, followed by several instances of two B-frames and a P-frame.

The chronological order of the frames will typically be I1, B2, B3, P4, B5, B6, and P7 which is typically similar to the presentation order. However, the decoding order will typically be I1, P4, B2, B3, P7, B5, B6, . . . , which is typically similar to the arrival order. The disparity between the presentation order and the decoding order is due to the fact that decoding a B-frame (e.g., B2 or B3) is conditioned in previously decoding the closest following P-frame (P4 in the above case). I-frames can be decoded without reference to another frame. So once I1 has been decoded it is typically the only uncompressed frame utilizing memory. P-frames are typically decoded with reference to another frame. So in this example P4 is decoded with reference to I1. Therefore, when P4 has been decoded, the uncompressed frames I1 and P4 are utilizing memory. B-frames are typically decoded with reference to two frames. So in this example, B2 is decoded with reference to P4 and I1. Therefore, when B2 has been decoded, the uncompressed frames P4, I1 and B2 are utilizing memory. Additionally, it should be noted that uncompressed frames typically represent the most significant use of decoder memory. Therefore, a B-frame that has just been decoded can be identified by the high memory required to store the two other uncompressed frames needed for decoding the B-frame in addition to the uncompressed B-frame.

The Headend 12 encodes the video sequence 16 such that the content protection message 20 is embedded in the encoded video sequence 16. The bits of the content protection message 20 are represented by one or more encoding features of the encoded video sequence 16. For example, when the encoding features include an arrangement of the I-frames and/or P-frames and/or B-frames of the encoded video sequence 16, the bits of the content protection message 20 are represented by the arrangement of the I-frames and/or P-frames and/or B-frames of the encoded video sequence 16.

At the set-top box 14, the encoding feature(s) of the received video sequence 16 are determined by analyzing measurements of memory usage utilized during decoding of the video sequence 16. Once the encoding feature(s) have been determined, the content protection message 20 can be extracted by analyzing the encoding features (block 22). By way of example only, the arrangement of the I-frames and/or P-frames and/or B-frames of the encoded video sequence 16 are analyzed to extract the content protection message 20 from the video sequence 16.

Figure 2:
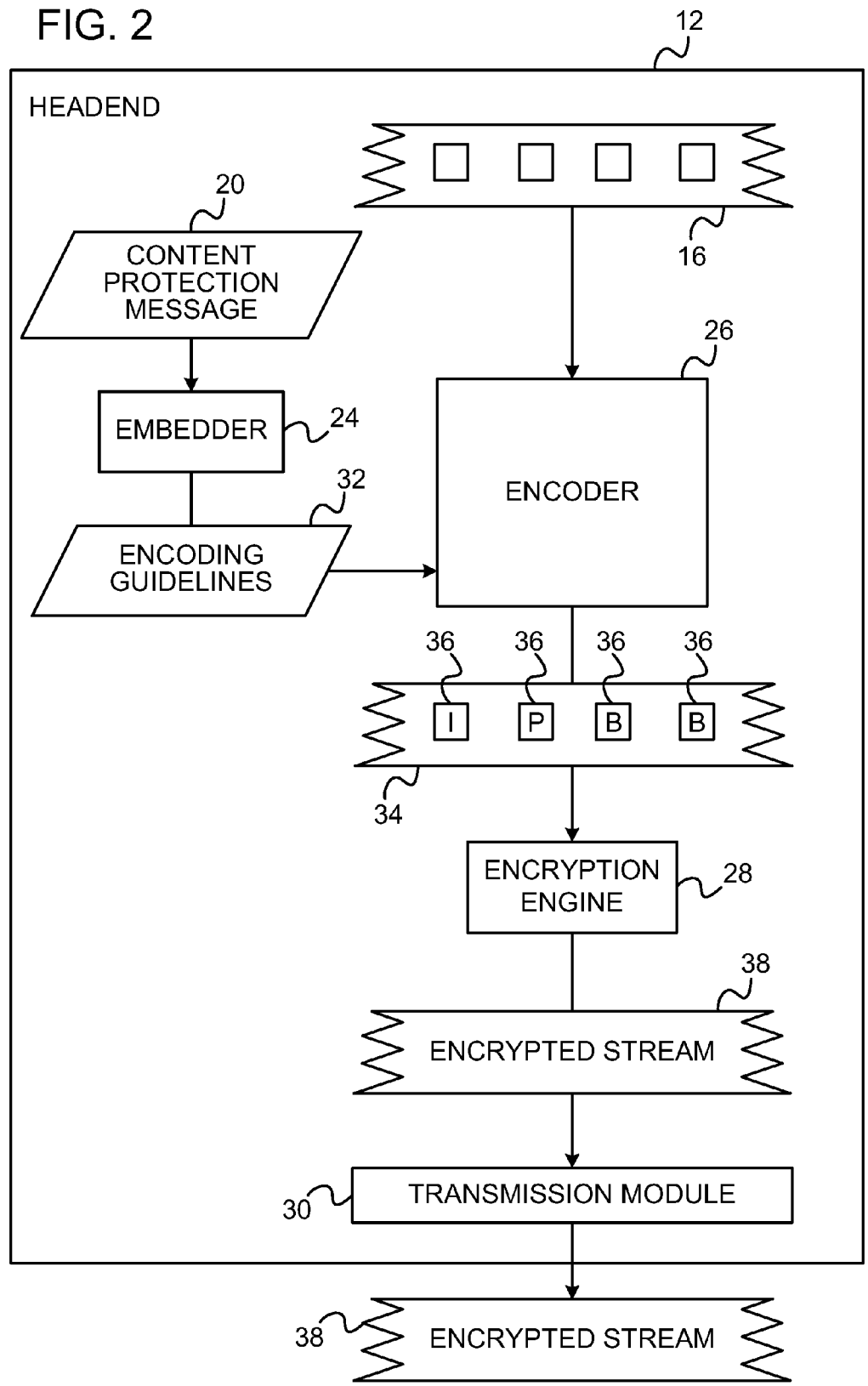
FIG. 2 is a partly pictorial, partly block diagram view of a Headend in the system of FIG. 1.

Reference is now made to FIG. 2, which is a partly pictorial, partly block diagram view of the Headend 12 in the system 10 of FIG. 1.

The Headend 12 typically includes a plurality of operationally connected modules including an embedder 24, an encoder 26, an encryption engine 28 and a transmission module 30.

The embedder 24 is typically operative to translate the content protection message 20 into encoding guidelines 32 for use by the encoder 26.

The encoder 26 typically includes a video codec to encode the video sequence 16 using the encoding guidelines 32 yielding a video-codec-encoded format video sequence 34 which includes encoding feature(s) representing the content protection message 20 embedded in the encoded video sequence 34.

The encoding features may include an arrangement of video frames 36 of at least one frame type in the encoded video sequence 34. The arrangement of the video frames 36 may include a plurality of positions of the video frames 36 in the encoded video sequence 34 and/or a quantity of the video frames in different parts of the video sequence 34.

By way of example, the content protection message 20 can be represented as a series of bits ('0's or '1's as appropriate). However, it will be appreciated by those ordinarily skilled in the art that the content protection message 20 may be represented in any suitable format. The encoding guidelines 32 may be based on any suitable method, for example, but not limited to: encoding the next 32 frames with an even number of I-frames for embedding a '0' and an odd number of I-frames for embedding a '1'; or encoding the next 32 frames with less than 14 B-frames for embedding a '0' and more than 20 B-frames for embedding a '1'. It will be appreciated by those ordinarily skilled in the art that numerous message embedding methods can be developed. Other message embedding methods are described with reference to FIG. 3.

It is desirable for the set-top boxes 14 to be informed by the Headend 12 as to which part of the encoded video sequence 34 includes the content protection message 20. Notification of the location of the content protection message 20 in the encoded video sequence 34 may be performed by the Headend 12 embedding a synchronization message, for example, but not limited to, "0101010101010101", using the same method as embedding the content protection message 20 in the video sequence 16 described above. Alternatively, notification of the location of the content protection message 20 in the encoded video sequence 34 may be performed by the Headend 12 embedding a special signal that is easier to notice than the synchronization message, for example, but not limited to, encoding a sequence of 10 frames without using B-frames, in which case frame drops are expected on the one hand and low memory consumption is expected on the other hand. The notification of the location of the content protection message 20 may occur once before the whole content protection message 20 or may occur many times such that notification is performed once before each different section of the content protection message 20 when the content protection message 20 is divided in to two or more parts.

The encryption engine 28 is typically operative to cryptographically encrypt the encoded video sequence 34 yielding an encrypted and encoded video sequence 38. However, it will be appreciated by those ordinarily skilled in the art that the system 10 may perform the embedding and extracting of the content protection message 20 even if the encoded video sequence 34 is sent to the set-top boxes 14 in the clear without encryption.

The transmission module 30 is typically operative to transmit the encrypted and encoded video sequence 38 to one or more of the set-top boxes 14 by any suitable transmission method.

It will be appreciated by those ordinarily skilled in the art that the encoded video sequence 34 may be transmitted as a single video sequence to the set-top boxes 14 or transmitted with other video sequences which are packaged together (typically multiplexed) into a transport stream for transmission (typically by broadcast) to the set-top boxes 14.

Figure 3:
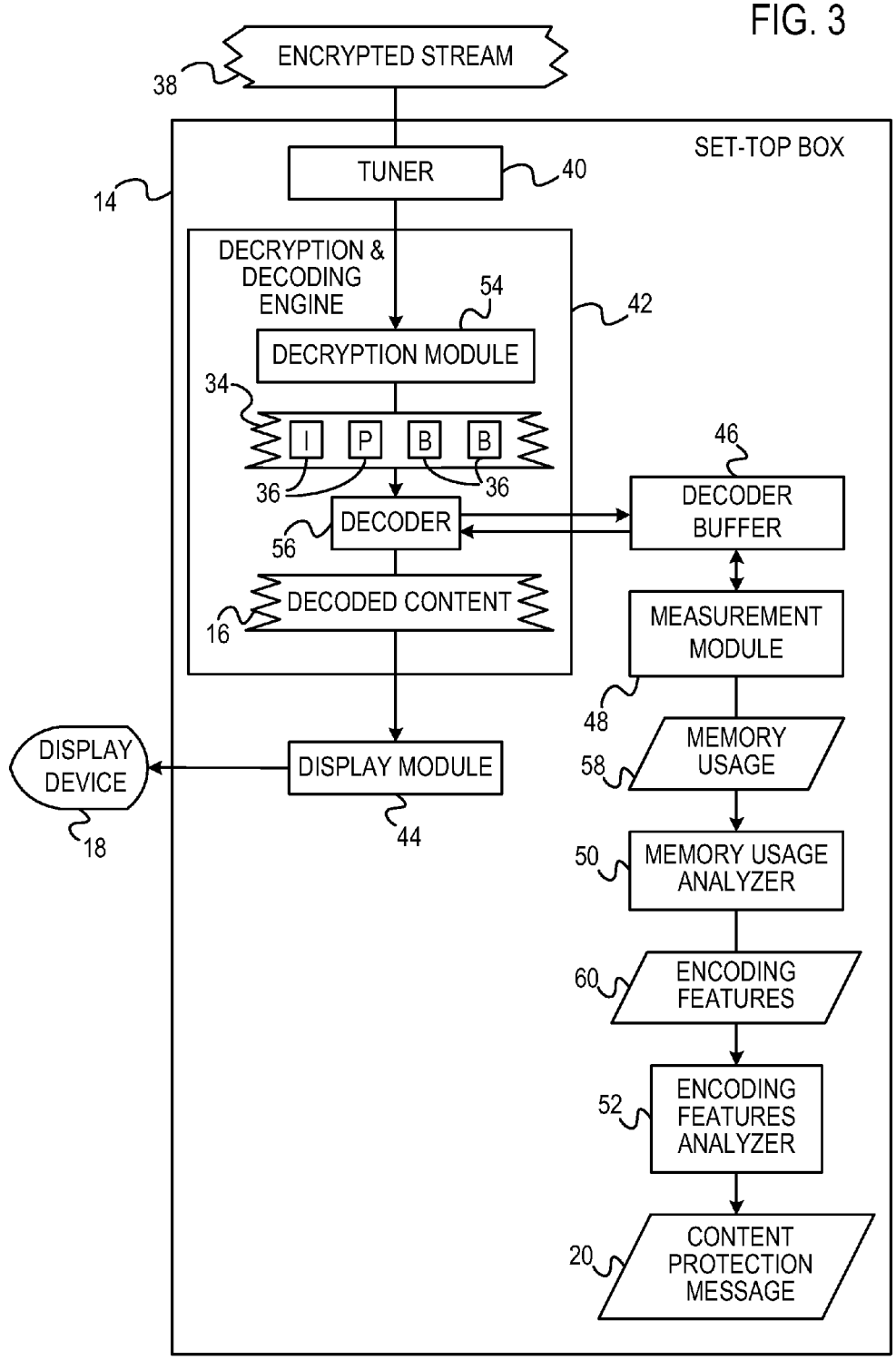
FIG. 3 is a partly pictorial, partly block diagram view of a set-top box in the system of FIG. 1.

Reference is now made to FIG. 3, which is a partly pictorial, partly block diagram view of one of the set-top boxes 14 in the system 10 of FIG. 1.

The set-top box 14 includes a plurality of operationally connected modules including one or more tuners 40, a decryption and decoding engine 42, a display module 44, a decoder buffer 46, a measurement module 48, a memory usage analyzer 50, an encoding features analyzer 52.

The tuner(s) 40 are operative to tune to the desired transport stream (not shown) including the encrypted and encoded video sequence 38.

The decryption and decoding engine 42 typically includes a decryption module 54 and a decoder 56.

The decryption module 54 is operative to receive the encrypted and encoded video sequence 38. Then, the decryption module 54 is operative to decrypt the encrypted and encoded video sequence 38 yielding the decrypted encoded video sequence 34 having the video-codec encoded format. Then, the decoder 56 is operative to: decode the decrypted video-codec-encoded video sequence 34 yielding the decrypted decoded video sequence 16; and output the decrypted decoded video sequence 16 to the display device 18 for rendering on the display device 18.

The decryption and decoding engine 42 may be secured such that the decrypted encoded video sequence 34 is unreadable from outside of the decryption and decoding engine 42. In such a case, the content protection message 20 cannot be retrieved from the decrypted encoded video sequence 34 by directly inspecting the decrypted encoded video sequence 34. Therefore, the content protection message 20 needs to be extracted by analyzing the memory usage of the decoder 56 as will now be described in more detail. However, it will be appreciated by those ordinarily skilled in the art that the system 10 is still useful even if the data being processed by the decryption and decoding engine 42 is readable from outside of the decryption and decoding engine 42.

The decoder buffer 46 is operative to store data used by the decoder 56 of the decryption and decoding engine 42 during the video decoding process. The decoder buffer 46 may be: an external buffer, for example, but not limited to, a separate dynamic random access memory (DRAM) or double data rate (DDR) chip; or an internal buffer. The decoder buffer 46 may comprise an arrangement of a plurality of buffers (not shown).

The measurement module 48 is operative to: measure memory usage of the decoder buffer 46, utilized by the decoder 56 decoding at least part of the video sequence 34, yielding a plurality of measurements of memory usage 58 utilized by the decoder 56 decoding the at least part of the video sequence 34; and pass the measurements of memory usage 58 to the memory usage analyzer 50. The measurements of memory usage 58 may be expressed as measurements of instantaneous occupancy of the decoder buffer 46.

It should be noted that the receive module 48 may integrated with the decoder buffer 46. Alternatively, the receive module 48 may be a separate element from the decoder buffer 46.

The memory usage analyzer 50 is operative to: receive the measurements of memory usage 58 from the measurement module 48; and analyze the measurements of memory usage 58 in order to determine relevant encoding feature(s) 60 of the video sequence 34. In accordance with an embodiment of the present invention the memory usage analyzer 50 is operative to determine all the frame types included in the encoded video sequence 34 based on the measurements of memory usage 58.

In accordance with an alternative embodiment of the present invention, as the content protection message 20 is embedded in the encoded video sequence 34 according to particular encoding guidelines 32 (FIG. 2), the memory usage analyzer 50 only needs to analyze the encoding feature(s) 60 of the encoded video sequence 34 that may be relevant to extracting the content protection message 20 from the encoded video sequence 34.

The encoding features 60 may include an arrangement of video frames 36 of at least one frame type in the encoded video sequence 34. The arrangement of the video frames 36 may include a plurality of positions of the video frames 36 in the encoded video sequence 34 and/or a quantity of the video frames in different parts of the video sequence 34.

The memory usage analyzer 50 typically performs the analysis of the measurements of memory usage 58 while taking into account the context of the decoding process. The context of the decoding process typically includes information about the set-top box 14 that the decoder 56 is running in, including:

the set of buffers available to the video decoding process and how the buffers are used by the set-top box 14; the video decoding unit (software and/or hardware); and the memory usage model. The context of the decoding process typically also includes information about the encoding method (for example, but not limited to, resolution, frame rate, bit rate), the codec (for example, but not limited to, profile and level), and possibly other encoding parameters.

In some environments it is not guaranteed that the memory usage analyzer 50 will be able to recover the exact sequence of frame types. Therefore, in order to improve the accuracy of the content protection message 20 extraction, the embedding of the content protection message 20 by the Headend 12 (FIG. 2) may be redundant.

One method of adding redundancy to the encoded video sequence 34 is for the encoder 26 (FIG. 2) to repeat the content protection message 20 several times, for example, but not limited to, 2× times when the memory usage analyzer 50 is expected to succeed in correctly analyzing the encoding feature(s) 60 for 1/x of the instances of the content protection message 20 in the encoded video sequence 34.

Another method is to add redundancy to the content protection message 20, for example, but not limited to, using error correcting codes.

A third method is to make the embedding of the content protection message 20 in the frame type sequence robust to imperfect reading of the frame types, for example, but not limited to, if there are less than T1 B-frames out of a certain number of frames then a '0' is read and if there are more than T2 B-frames out of a certain number of frames then a '1' is read, and if the number of read B-frames is between T1 and T2 then no bit is read, where T1 is less than T2. The location of the content protection message 20 is notified by any suitable method, such as one of the notification methods mentioned above with reference to FIG. 2.

The encoding features analyzer 52 is typically operative to: receive the encoding feature(s) 60 from the memory usage analyzer 50; and analyze the encoding feature(s) 60 of the encoded video sequence 34 in order to extract the content protection message 20 from the encoded video sequence 34.

When the encoding feature(s) 60 include an arrangement of the video frames 36 of at least one frame type in the encoded video sequence 34, the encoding feature analyzer 52 is operative to analyze the arrangement of the video frames 36 of the video sequence 34 in order to extract the content-protection message 20 from the video sequence 34.

By way of example only, some methods for encoding the content protection message 20 in the encoded video sequence 34 are described below.

Suppose for example that the encoded video sequence 34 is required to have an I-Frame every 0.5 seconds on average and that the encoded video sequence 34 is encoded with 32 frames per second, namely substantially every 16th frame is an I-Frame. Then, the following embedding may be used. For the $i^{th}$ bit $b_i$, F1 to F20 are the sequence of frames in which $b_i$ is embedded. F1 is an I-frame. In order to keep the 1:16 ratio of I-frames to other frame types, one of the frames between F12 and F20 is defined as an I-frame. If bi is to equal '0', then one of the frames in the range F12 to F15 is an I-frame; whereas if bi is to equal '1', then one of the frames in the range F16 to F20 is an I-frame. In the above example the encoding features analyzer 52 is typically operative to find the distance (in frames) between the I-frames, and read '0' when this distance is smaller than 15 and '1' otherwise.

Another example of a method of embedding the content protection message 20 is based on the number of B-frames in a sequence of, say, 20 frames. The embedder 24 (FIG. 2) prepares the encoding guidelines 32 such that the encoder 26 (FIG. 2) uses less than 8 B-frames out of the 20 frames for a '0' and more than 12 B-frames out of the 20 frames for a '1'. It should be noted that in order to keep on the bit rate, it is possible that the above method will result in degradation in the quality of the video, for example, but not limited to, by forcing the encoder 26 to drop one or more frames. The encoding features analyzer 52 is operative to count the number of B-frames in every sequence of 20 frames to decide whether a '0' or a '1' has been embedded in the encoded video sequence 34.

In order to avoid faulty reading, the embedded content protection message 20 can be wrapped with an error correction code and/or cryptographic authentication signature(s), such as digital signatures or message authentication codes), before being embedded. By way of example only, if the content protection message 20 is denoted M, then the embedded data will be M, CRC32 (M), MAC (K, M), where: CRC32 is 4 bytes which are the result of calculating CRC over M; and MAC (K, M) is the result of using a Message Authentication Code with a key K on the message M.

The system 10 may be used with any suitable type of video decoder.

For hardware video decoders, commonly used in digital set-top boxes, the content processing unit is sometimes a closed protected environment that is inaccessible for the set-top box (STB) central processing unit (CPU), for example, but not limited to, when the STB is protected with the Secure Video Processor (SVP) technology of the SVP Alliance. In such a case, the STB CPU may be given access to information from the STB memory buffers for analysis.

For software decoders, in many STBs, personal computers (PCs), and media centers, the software architecture includes a secure area such as the Windows Kernel or Linux Kernel, with applications running in out of the secure area. In such a case a DRM application might have access to the memory consumption information on the machine. The memory information can then be used by the memory usage analyzer 50.

An external access method can be also used when there is no direct access to the machine In such a case, the interface between the video decoder and the external memory can be physically connected to, in order to measure the memory consumption level.

It will be appreciated that the memory usage analyzer 50 and the encoding features analyzer 52 may be comprised in a content-protection message extractor (not shown).

In accordance with an alternative embodiment of the present invention, the content-protection message extractor is operative to: receive the measurements of memory usage 58 from the measurement module 48; and analyze the measurements of memory usage 58 in order to extract the content-protection message 20 from the video sequence 34 so that the content protection message 20 is extracted from the measurements of memory usage 58 without first having to determine the encoding feature(s) 60.

The description above described an embodiment whereby the encoding feature(s) 60 include an arrangement of video frames 36 of at least one frame type in the encoded video sequence 34. However, it will be appreciated by those ordinarily skilled in the art that the encoding feature(s) 60 may include any suitable encoding feature(s) 60 such that the content protection message 20 can be derived from the measurements of memory usage 58. A few alternatives for the encoding feature(s) 60 are listed below.

The encoding feature(s) 60 may include an assignment of intra-blocks and predicted blocks (and bi-predicted blocks, if applicable) in the video frame(s) 36 of the encoded video sequence 34. In other words the content protection message 20 may be embedded in the encoded video sequence 34 according to how the blocks of the video frame(s) 36 are assigned as either intra-blocks or predicted blocks (or bi-predicted blocks).

By way of introduction, MPEG pictures are typically segmented into macroblocks, and individual prediction types can be selected on a macroblock basis rather than being the same for the entire picture. Therefore, although I-frames can contain only intra macroblocks, P-frames can contain either intra macroblocks or predicted macroblocks and B-frames can contain intra, predicted, or bi-predicted macroblocks.

It will be appreciated that a macroblock encoded as a predicted macroblock or bi-predicted macroblock will be smaller than if the same macroblock is encoded as an intra macroblock. Therefore, the size of an encoded frame 36 and the memory used to decode the encoded frame 36 will depend on how the macroblocks are encoded as either intra macroblocks or predicted macroblocks (or bi-predicted macroblocks, if applicable), or any suitable combination thereof.

Assuming that when a frame 36 (P-frame or B-frame) is encoded efficiently, the size of the frame is less than a certain size Y. The content protection message 20 may be embedded into the encoded video sequence 34 by adjusting the size of the P-frames and/or B-frames so that for example, the encoded frame 36 represents a '0' of the content protection message 20 when the size of the encoded frame 36 is "adjusted" to be above a certain size X and an encoded frame 36 (P-frame or B-frame) represents a '1' of the content protection message 20 when the size of the encoded frame 36 is unchanged at below size Y.

Certain frames 36, even when encoded as efficiently as possible, may already be above the size Y without the above-mentioned "adjustment" for adding size to frames. Therefore, a frame 36 which will be above the size Y, when encoded without the embedding "adjustment", is generally not used for embedding. Therefore, a suitable sequence or sequences of frames 36 are chosen for embedding the content protection message 20 therein such that the frames 36 in the sequence(s) would each be less than size Y if encoded efficiently without the embedding adjustment.

Therefore, the embedder 24 (FIG. 2) is operative to set sizes X and Y, X being greater than Y.

The embedder 24 (FIG. 2) is also operative to identify a sequence or sequences of frames in which the content protection message 20 can be embedded. As described above, if the size of an encoded frame (when most efficiently encoded) is larger than Y without the embedding adjustment, then the frame cannot be used to embed the content protection message 20.

The embedder 24 analyzes the frames 36 of the sequence(s) to find the most optimal motion estimation, including macroblocks encoded as intra macroblocks, predicted macroblocks and/or bi-predicted macroblocks. So for example, if a '0' is to be embedded in a frame 36, the encoding guidelines 32 (FIG. 2) sent by the embedder 24 to the encoder 26 (FIG. 2) instruct the encoder 26 to encode the frame 36 less efficiently to a size that exceeds X, for example, by encoding macroblocks that would be optimally encoded as predicted macroblocks, using only intra macroblocks, or by encoding macroblocks that would be optimally encoded as bi-predicted macroblocks, as predicted macroblocks or intra macroblocks. On the other hand, if a '1' is to be embedded in the frame 36, the encoding guidelines 32 would instruct the encoder 26 to encode the frame 36 as efficiently as possible so that the size of the encoded frame 36 is less than Y.

In the set-top box 14, the content-protection message extractor is operative to identify the size of the frames and therefore extract the content protection message 20 based on the measurements of memory usage 58 utilized by the decoder 56 during decoding of the video frames 36 of the encoded video sequence 34.

In an alternative embodiment of the present invention, the encoding feature(s) 60 may include the use of at least one encoding dictionary in the embedding of the content protection message 20.

By way of introduction, encoding dictionaries, for example, but not limited to, modified Huffman VLC tables, are used in the encoding of video frames. Some encoding dictionaries are more efficient than others. Therefore, the video frames 36 may be encoded to different sizes by using different encoding dictionaries for different frames so that the content protection message 20 may be embedded in the encoded video sequence 34 by using the different encoding dictionaries for different frames as necessary.

Assuming that when a frame 36 is encoded efficiently, the size of the frame is less than a certain size L. The content protection message 20 may be embedded into the encoded video sequence 34 by adjusting the size of the frames so that for example, an encoded frame 36 represents a '0' of the content protection message 20 when the size of the encoded frame 36 is "adjusted" to be above a certain size M and an encoded frame 36 represents a '1' of the content protection message 20 when the size of the encoded frame 36 is unchanged at below size L.

Certain frames 36, even when encoded as efficiently as possible using the most efficient encoding dictionary, may already be above the size L without the abovementioned "adjustment" for adding size to frames. Therefore, a frame 36 which will be above the size L, when encoded without the embedding "adjustment", is generally not used for embedding. Therefore, a suitable sequence or sequences of frames 36 are chosen for embedding the content protection message 20 therein such that the frames 36 in the sequence(s) would each be less than size L if encoded efficiently without the embedding adjustment.

The encoder 26 (FIG. 2) is operative to include two or more encoding dictionaries in the encrypted and encoded video sequence 38 for use by the decoder 56 during decoding of the encoded video sequence 34.

The embedder 24 (FIG. 2) is operative to set sizes L and M, M being greater than L.

The embedder 24 (FIG. 2) is also operative to identify a sequence or sequences of frames in which the content protection message 20 can be embedded. As described above, if the size of an encoded frame (when most efficiently encoded) is larger than L without the embedding adjustment, then the frame cannot be used to embed the content protection message 20.

The embedder 24 analyzes the frames 36 of the sequence(s) to find the most optimal motion estimation and most optimal encoding dictionary individually for each of the frames 36. So for example, if a '0' is to be embedded in a frame 36, the encoding guidelines 32 (FIG. 2) sent by the embedder 24 to the encoder 26 (FIG. 2) instruct the encoder 26 to encode the frame 36 less efficiently to a size that exceeds M, for example, by using a less efficient encoding dictionary. On the other hand, if a '1' is to be embedded in the frame 36, the encoding guidelines 32 would instruct the encoder 26 to encode the frame 36 as efficiently as possible so that the size of the encoded frame 36 is less than L.

In addition, the encoder 26 operative to provide an indication in the encrypted and encoded video sequence 38 of which encoding dictionary is being used for each frame 36 for use by the decoder 56 during decoding of the encoded video sequence 34.

In the set-top box 14, the content-protection message extractor is operative to identify the size of the frames and therefore extract the content protection message 20 based on the measurements of memory usage 58 utilized by the decoder 56 during decoding of the video frames 36 of the encoded video sequence 34.

It will be appreciated by those ordinarily skilled in the art that the possible encoding features 60 listed above may be used individually or in any suitable combination thereof in order to embed the content protection message 20 in the encoded video sequence 34.

Figure 4:
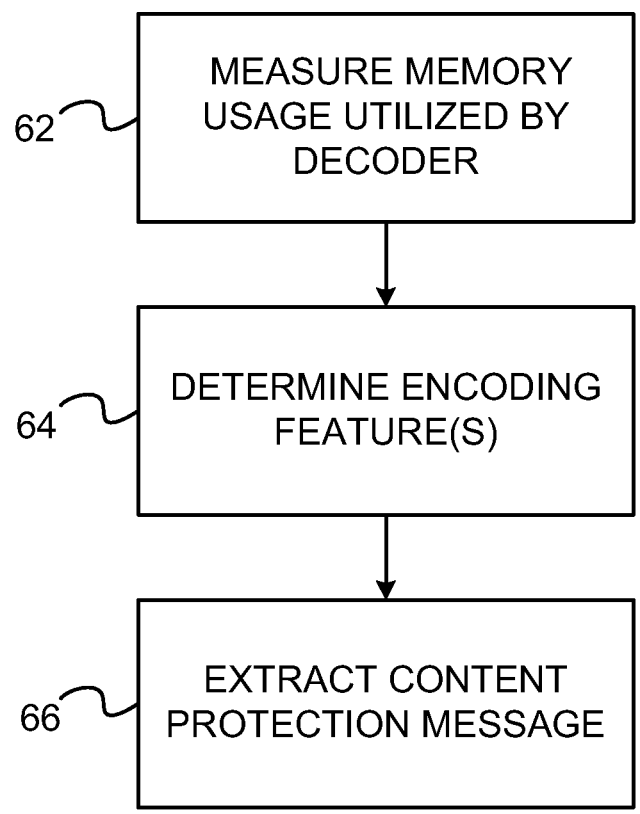
FIG. 4 is a flow chart showing steps in the operation of the set-top box of FIG. 3.

Reference is now made to FIG. 4, which is a flow chart showing steps in the operation of the set-top box 14 of FIG. 3. Reference is also made to FIG. 3.

The method for extracting the content protection message 20 embedded in the encoded video sequence 34 typically includes: receiving the measurements of memory usage 58 utilized by the decoder 56 decoding at least part of the encoded video sequence 34 (block 62); analyzing the measurements of memory usage 58 in order to determine the encoding feature(s) 60 of the encoded video sequence 34 (block 64); and analyzing the encoding feature(s) 60 of the encoded video sequence 34 in order to extract the content protection message 20 from the encoded video sequence 34 (block 66).

It is appreciated that software components of the present invention may, if desired, be implemented in ROM (read only memory) form. The software components may, generally, be implemented in hardware, if desired, using conventional techniques. It is further appreciated that the software components may be instantiated, for example, as a computer program product; on a tangible medium; or as a signal interpretable by an appropriate computer.

It will be appreciated that various features of the invention which are, for clarity, described in the contexts of separate embodiments may also be provided in combination in a single embodiment. Conversely, various features of the invention which are, for brevity, described in the context of a single embodiment may also be provided separately or in any suitable sub-combination.

It will be appreciated by persons skilled in the art that the present invention is not limited by what has been particularly shown and described hereinabove. Rather the scope of the invention is defined by the appended claims and equivalents thereof.

What is claimed is:

1. A system for extracting a video-watermark embedded in a video sequence, the system comprising a plurality of operatively connected modules including:
   a decryption and decoding engine, the decryption and decoding engine being operative to:
   receive the video sequence in a video-codec-encoded format and cryptographically-encrypted; then
   decrypt the encrypted video sequence yielding a decrypted video sequence having the video-codec encoded format; then
   decode the decrypted video-codec-encoded video sequence yielding a decrypted decoded video sequence; and then
   output the decrypted decoded video sequence to a display device for rendering on the display device;
   a decoder buffer to store data used by the decryption and decoding engine during decoding;
   a measurement module to measure memory usage of the decoder buffer utilized by the decryption and decoding engine decoding at least part of the video sequence yielding a plurality of measurements of memory usage utilized by the decryption and decoding engine decoding the at least part of the video sequence;
   a memory usage analyzer to: receive the measurements of memory usage from the measurement module; and analyze the measurements of memory usage in order to determine an arrangement of a plurality of video frames of at least one frame type in the video sequence; and
   an encoding feature analyzer to: receive the arrangement of the video frames from the memory usage analyzer; and analyze the arrangement of the video frames of the at least one frame type in the video sequence in order to extract the video-watermark from the video sequence.

2. A system for extracting a content-protection message embedded in a video sequence, the system comprising a plurality of operatively connected modules including:
   a measurement module to measure memory usage utilized by a decoder decoding at least part of the video sequence yielding a plurality of measurements of memory usage utilized by the decoder decoding the at least part of the video sequence; and
   a content-protection message extractor to:
   receive the measurements of memory usage from the measurement module; and
   analyze the measurements of memory usage in order to extract the content-protection message from the video sequence,
   wherein the content-protection message extractor includes:
   a memory usage analyzer to: receive the measurements of memory usage from the measurement module; and analyze the measurements of memory usage in order to determine at least one encoding feature of the video sequence; and
   an encoding feature analyzer to: receive the at least one encoding feature from the memory usage analyzer; and analyze the at least one encoding feature of the video sequence in order to extract the content-protection message from the video sequence.

3. The system according to claim 2, wherein the modules further include a decryption and decoding engine including the decoder, the decryption and decoding engine being operative to:
   receive the video sequence in a video-codec-encoded format and cryptographically-encrypted; then
   decrypt the encrypted video sequence yielding a decrypted video sequence having the video-codec encoded format; then
   decode the decrypted video-codec-encoded video sequence yielding a decrypted decoded video sequence; and then
   output the decrypted decoded video sequence to a display device for rendering on the display device.

4. The system according to claim 2, wherein the at least one encoding features includes an arrangement of a plurality of video frames of at least one frame type in the video sequence.

5. The system according to claim 4, wherein the arrangement of the video frames includes a plurality of positions of the video frames in the video sequence.

6. The system according to claim 4, wherein the arrangement of the video frames includes a quantity of the video frames in different parts of the video sequence.

7. The system according to claim 4, wherein the encoding feature analyzer is operative to analyze the arrangement of the video frames of the video sequence in order to extract the content-protection message from the video sequence.

8. The system according to claim 2, wherein the content-protection message includes a video watermark.

9. The system according to claim 8, wherein the watermark includes a copyright flag.

10. The system according to claim 8, wherein the watermark includes an identification of a content item included in the video sequence.

11. A method for extracting a content-protection message embedded in a video sequence, the method comprising:
    measuring memory usage utilized by a decoder decoding at least part of the video sequence yielding a plurality of measurements of memory usage utilized by the decoder decoding at least part of the video sequence;
    analyzing the measurements of memory usage in order to determine at least one encoding feature of the video sequence; and
    analyzing the at least one encoding feature of the video sequence in order to extract the content-protection message from the video sequence.

12. A system for extracting a content-protection message embedded in a video sequence, the system comprising a plurality of operatively connected modules including:
    means for measuring memory usage utilized by a decoder decoding at least part of the video sequence yielding a plurality of measurements of memory usage utilized by the decoder decoding the at least part of the video sequence; and
    means for analyzing the measurements of memory usage in order to extract the content-protection message from the video sequence.

* * * * *